(12) United States Patent
Shi et al.

(10) Patent No.: US 9,507,115 B2
(45) Date of Patent: Nov. 29, 2016

(54) METHOD FOR DETERMINING THE EDGES OF AN OVERLAPPING REGION BETWEEN A COLOR FILTER AND A BLACK MATRIX

(71) Applicant: Shenzhen China Star Optoelectronics Technology Co., Ltd., Shenzhen, Guangdong (CN)

(72) Inventors: Kai Shi, Guangdong (CN); Lindou Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/418,192

(22) PCT Filed: Jan. 21, 2015

(86) PCT No.: PCT/CN2015/071234
§ 371 (c)(1),
(2) Date: May 9, 2016

(87) PCT Pub. No.: WO2016/101376
PCT Pub. Date: Jun. 30, 2016

(65) Prior Publication Data
US 2016/0246026 A1 Aug. 25, 2016

(30) Foreign Application Priority Data

Dec. 26, 2014 (CN) .......................... 2014 1 0837283

(51) Int. Cl.
| G02B 5/00 | (2006.01) |
| G02B 5/22 | (2006.01) |
| G02F 1/1335 | (2006.01) |
| G02B 7/00 | (2006.01) |
| G09G 3/20 | (2006.01) |
| G01M 11/00 | (2006.01) |

(52) U.S. Cl.
CPC .............. *G02B 7/003* (2013.01); *G01M 11/00* (2013.01); *G02B 5/003* (2013.01); *G02B 5/22* (2013.01); *G02F 1/1335* (2013.01); *G09G 3/2007* (2013.01); *G09G 2310/027* (2013.01)

(58) Field of Classification Search
CPC ....... G01M 11/00; G02B 5/003; G02B 5/22; G02B 7/003; G02F 1/1335; G09G 3/2007; G09G 2310/027
See application file for complete search history.

(56) References Cited

U.S. PATENT DOCUMENTS

2006/0055985 A1* 3/2006 Ikeda ..................... H04N 1/409
358/463

FOREIGN PATENT DOCUMENTS

| CN | 102520537 A | 6/2012 |
| CN | 102854195 A | 1/2013 |

(Continued)

OTHER PUBLICATIONS

International Search Report and Written Opinion, Jan. 21, 2015, China.

*Primary Examiner* — Alexander Eisen
*Assistant Examiner* — Abhishek Sarma
(74) *Attorney, Agent, or Firm* — Kim Winston LLP (57) ABSTRACT

Disclosed is a method for determining edges of an overlapping region between a color filter and a black matrix, which comprises the following steps. An original gray-scale value curve and a differential gray-scale value curve of the measurement area to be detected are drawn, and extremums of the differential gray-scale value curve are determined. A gray-scale value of the overlapping region between the color filter and the black matrix is obtained. A threshold value is established. Two extremums of the differential gray-scale value curve which are the closest to the two intersections respectively are obtained, and then the edges of the overlapping region between the color filter and the black matrix are determined based on the two extremums.

10 Claims, 8 Drawing Sheets

(56) References Cited

FOREIGN PATENT DOCUMENTS

| CN | 103033343 A | 4/2013 |
| CN | 103759644 A | 4/2014 |
| JP | 2011257262 A | 9/2001 |
| JP | 2010097109 A | 4/2010 |

* cited by examiner

---- Original Gray-Scale Value Curve
—— Differential Gray-Scale Value Curve

---- Original Gray-Scale Value Curve
—— Differential Gray-Scale Value Curve

- - - - Original Gray-Scale Value Curve
——— Differential Gray-Scale Value Curve

Fig. 13

METHOD FOR DETERMINING THE EDGES OF AN OVERLAPPING REGION BETWEEN A COLOR FILTER AND A BLACK MATRIX

The present application claims benefit of Chinese patent application CN201410837283.5, entitled "Method for determining edges of an overlapping region between a color filter and a black matrix" and filed on Dec. 26, 2014, the entirety of which is incorporated herein by reference.

TECHNICAL FIELD

The present disclosure relates to the technical field of display, and in particular, to a method for determining edges of an overlapping region between a color filter and a black matrix.

TECHNICAL BACKGROUND

In the process of manufacturing color filter substrates, the size of a color filter and the overlapping region between the color filter and a black matrix should be strictly controlled to avoid light leakage or overlaps between adjacent color filters. Currently, in this field, the overlapping region between a color filter and a black matrix is determined mainly through the difference of gray-scale values at the edges of the color filter and the black matrix. Specifically, the edges of the overlapping region can be determined through the following steps.

Figure 1:
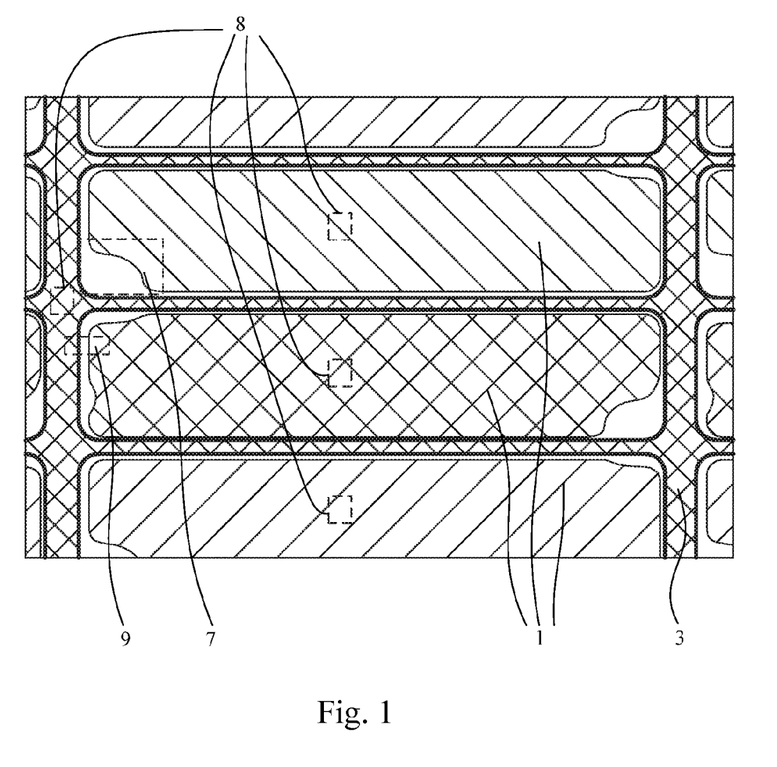
FIG. 1 schematically shows a measurement area to be detected according to the technical background, or a benchmark area according to the embodiments of the present disclosure.
Figure 2:
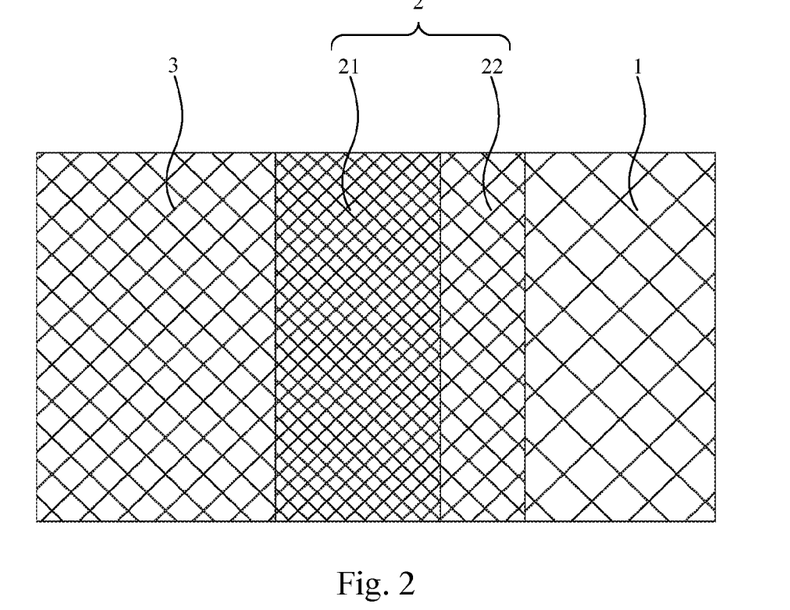
FIG. 2 schematically shows a larger version 1 of a measurement area according to FIG. 1.
Figure 3:
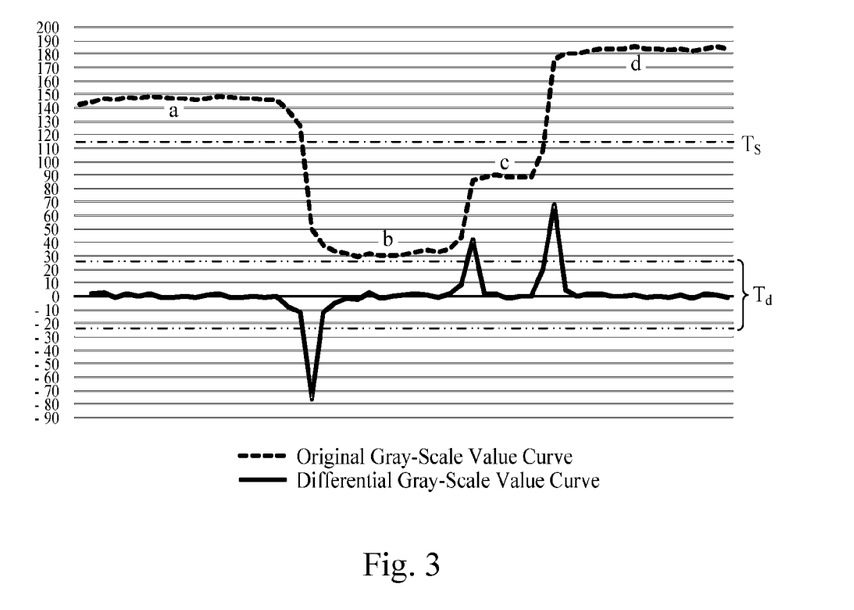
FIG. 3 shows an original gray-scale value curve and a differential gray-scale value curve according to FIG. 2.

As shown in FIG. 1, an area to be detected is imaged by a charge-coupled element. The area to be detected comprises color filters 1 each having a different color. For ease of distinguishing, the color filters of different colors in FIG. 1 are filled by different patterns. FIG. 2 shows a magnified version of the measurement area to be detected 9 which are indicated by the dashed box in the area to be detected in FIG. 1. The measurement area to be detected 9 comprises an overlapping region 2, and a color filter 1 and a black matrix 3 on each side of the overlapping region. In FIG. 2, the gray-scale value is indicated by the density of the filled pattern. The larger the gray-scale value is, the sparser the filled pattern is, and vice versa. Then, an original gray-scale value curve is drawn as shown in FIG. 3 based on the variation of the gray-scale value from left to right in the measurement area to be detected 9, and a differential gray-scale value curve is obtained by calculating the difference of the original gray-scale value curve. Since the color filter 1 and the black matrix 3 overlap to different degrees, the overlapping region 2 usually comprises a first overlapping region 21 and a second overlapping region 22 having different gray-scale values. Therefore, as shown in FIG. 3, the original gray-scale value curve basically comprises four phases, and the corresponding differential gray-scale value curve comprises three distinct extremums. An engineer can set an extremum range $T_d$, namely the range between the two double-dot lines as shown in FIG. 3. Thus, a detecting device will be able to obtain the three distinct extremums based on the predetermined extremum range $T_d$.

Figure 4:
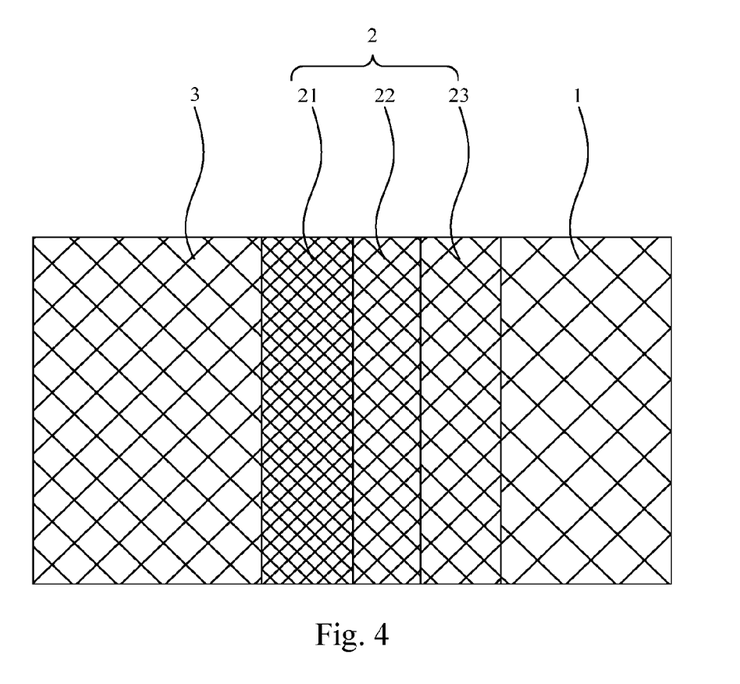
FIG. 4 schematically shows a larger version 2 of the measurement area according to FIG. 1.
Figure 5:
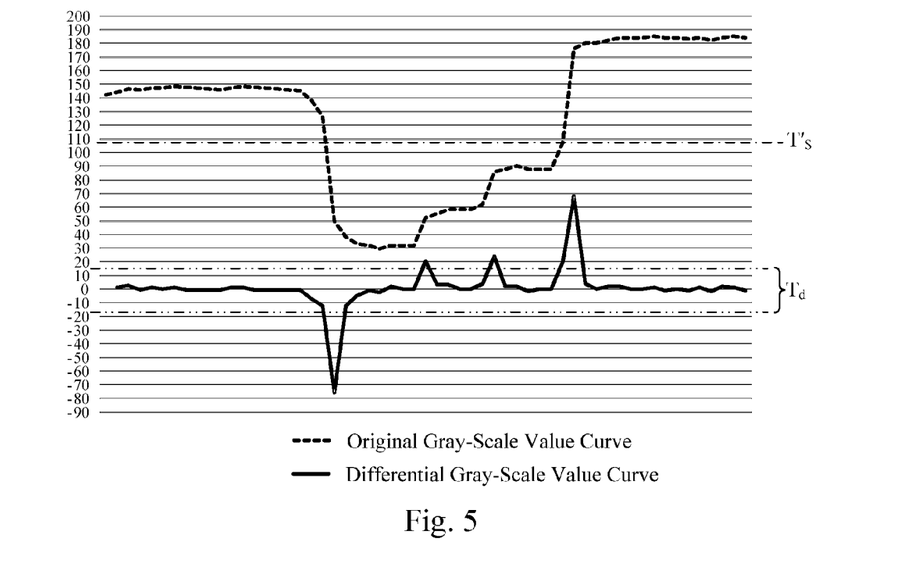
FIG. 5 shows an original gray-scale value curve and a differential gray-scale value curve according to FIG. 4.

In the prior arts, it is commonly acknowledged that the overlapping region 2 between the color filter 1 and the black matrix 3 can be determined by the first distinct extremum and the third distinct extremum existing along a direction from left to right. However, the inventor found that, as shown in FIGS. 4 and 5, if the engineer fails to set an appropriate extremum range, and if the light intensity is low when imaging, there might be four distinct extremums. Obviously, in such a case, the edges of the overlapping region 2 determined by the above method will not be what they actually are.

In addition, in the process of manufacturing color filter substrates, if the color filter substrate suffers a shift, which is still within an accuracy range, the edges of the overlapping region 2 will also shift, which will render the overlapping region 2 wider or narrower. As shown in FIGS. 4 to 7, when the overlapping region 2 gets wider or narrower, the number of the extremums will be increased (five as shown in FIG. 5) or decreased (two as shown in FIG. 7), in which case, it will be impossible to determine the edges of the overlapping region 2 through the existing method.

SUMMARY OF THE INVENTION

The objective of the present disclosure is to provide a method for determining edges of an overlapping region between a color filter and a black matrix, so as to solve the technical problem that, when the light intensity is inappropriate or the width of the overlapping region changes, the edges of an overlapping region between a color filter and a black matrix cannot be determined accurately.

The present disclosure provides a method for determining edges of an overlapping region between a color filter and a black matrix, which comprises the following steps. A measurement area to be detected is acquired, the measurement area to be detected including a color filter, a black matrix, and an overlapping region therebetween. An original gray-scale value curve and a differential gray-scale value curve of the measurement area to be detected are drawn, and extremums of the differential gray-scale value curve are determined based on a predetermined extremum range. A gray-scale value of the overlapping region between the color filter and the black matrix is obtained according to gray-scale values of the color filter and the black matrix in the measurement area to be detected and based on a first preset rule. A threshold value is established according to the gray-scale values of the color filter, the black matrix, and the overlapping region and based on a second preset rule. According to two intersections of the threshold value and the original gray-scale value curve, two extremums of the differential gray-scale value curve which are the closest to said two intersections respectively are obtained. And then according to the two extremums, the edges of the overlapping region between the color filter and the black matrix are determined.

The step of obtaining the measurement area to be detected which includes a color filter, a black matrix, and an overlapping region therebetween further comprises the following steps. An area to be detected which includes color filters each having a different color is acquired based on a third preset rule. Gray-scale values of the color filters and the black matrix in the area to be detected are obtained. And, for each of the color filters each having a different color, a measurement area to be detected which includes a color filter, a black matrix, and an overlapping region therebetween is acquired.

The method further comprises the following steps. A benchmark area on a same color filter substrate is acquired, the benchmark area including color filters each having a different color, and a matching area of the benchmark area is determined. Gray-scale values of the color filters each having a different color and the black matrix in the benchmark area are obtained. For each of the color filters each having a different color, a benchmark measurement area to be detected which includes a color filter, a black matrix, and an overlapping region therebetween is acquired. An original gray-scale value curve and a differential gray-scale value curve of the benchmark measurement area are drawn, and an extremum range are set and stored for determining extremums of the differential gray-scale value curve. And then an original threshold value is determined according to the original gray-scale value curve.

The method further comprises the following steps. Light intensity is adjusted, and under each light intensity, gray-scale values of the color filter, the black matrix, and the overlapping region therebetween in the benchmark measurement area are obtained so as to generate a table of benchmark gray-scale values.

In the first preset rule, according to the gray-scale values of the color filter and the black matrix in the measurement area to be detected, gray-scale values of a corresponding color filter and a corresponding black matrix are found out from the table of benchmark gray-scale values, and a gray-scale value of a corresponding overlapping region is obtained from the table of benchmark gray-scale values.

In the second preset rule, a threshold value is established according to the original threshold value, the gray-scale values of the color filter and the black matrix in the measurement area to be detected, and the gray-scale values of the corresponding color filter, black matrix and overlapping region in the table of benchmark gray-scale values.

The overlapping region includes a first overlapping region and a second overlapping region having different gray-scale values.

In the second preset rule, specifically, a threshold value is established according to a smaller one of the gray-scale values of the color filter and the black matrix in the measurement area to be detected, a larger one of the gray-scale values of the corresponding color filter and black matrix in the table of benchmark gray-scale values, and a larger one of obtained gray-scale values of the first overlapping region and the second overlapping region in the overlapping region, based on the original threshold value.

In the third preset rule, an area to be detected is acquired according to the matching area and a position thereof in the benchmark area.

The method further comprises, after determining the edges of the overlapping region between the color filter and the black matrix according to the two extremums, the following steps. An original gray-scale value curve is fitted by Gauss curve fitting method or binomial differential method, and a width value of the overlapping region is obtained based on the determined edges of the overlapping region between the color filter and the black matrix.

The present disclosure achieves the following beneficial effects. The technical solutions provided in the embodiments of the present disclosure provide a method for determining edges of an overlapping region between a color filter and a black matrix, which can prevent the situation where, due to an inappropriate light intensity or a shift of color filter substrate in its manufacturing process, the edges of the overlapping region determined are not what they actually are. The method is easy to operate, and is helpful in improving the accuracy and stability of determining the overlapping region.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

Embodiment 1

Figure 8:
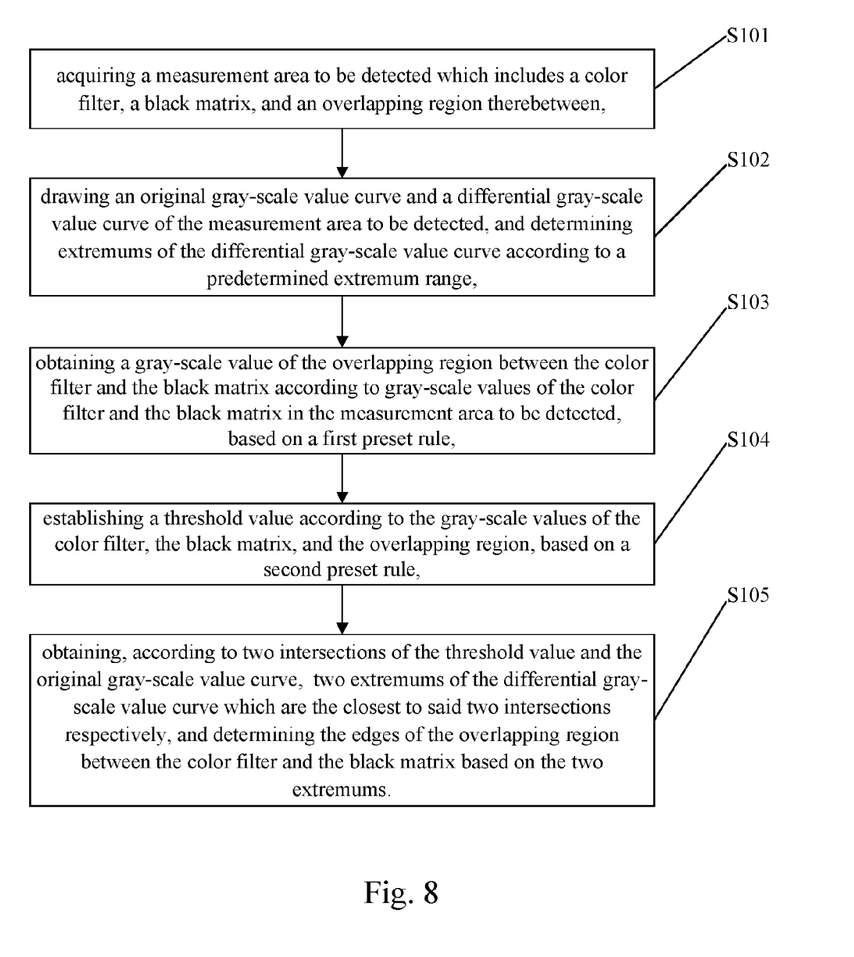
FIG. 8 schematically shows a flow chart 1 of a method for determining edges of an overlapping region between a color filter and a black matrix according to the embodiments of the present disclosure.

The present embodiment provides a method for determining edges of an overlapping region between a color filter and a black matrix. As shown in FIG. 8, the method comprises the following steps.

In step S101, a measurement area to be detected, which includes a color filter, a black matrix, and an overlapping region therebetween, is acquired.

In step S102, an original gray-scale value curve and a differential gray-scale value curve of the measurement area to be detected are drawn, and extremums of the differential gray-scale value curve are determined according to a predetermined extremum range.

In step S103, a gray-scale value of the overlapping region between the color filter and the black matrix is obtained according to the gray-scale values of the color filter and the black matrix in the measurement area to be detected, based on a first preset rule.

In step S104, a threshold value is established according to the gray-scale values of the color filter, the black matrix, and the overlapping region, based on a second preset rule.

In step S105, according to two intersections of the threshold value and the original gray-scale value curve, two extremums of the differential gray-scale value curve which are the closest to said two intersections respectively are obtained, and then the edges of the overlapping region between the color filter and the black matrix are determined based on said two extremums.

The technical solution provided in the present embodiment provides a method for determining edges of an overlapping region between a color filter and a black matrix, which can prevent the situation where, due to an inappropriate light intensity or a shift of color filter substrate in its manufacturing process, the edges of the overlapping region determined are not what they actually are. The method is easy to operate, and is helpful in improving the accuracy and stability of determining the overlapping region.

Embodiment 2

Figure 9:
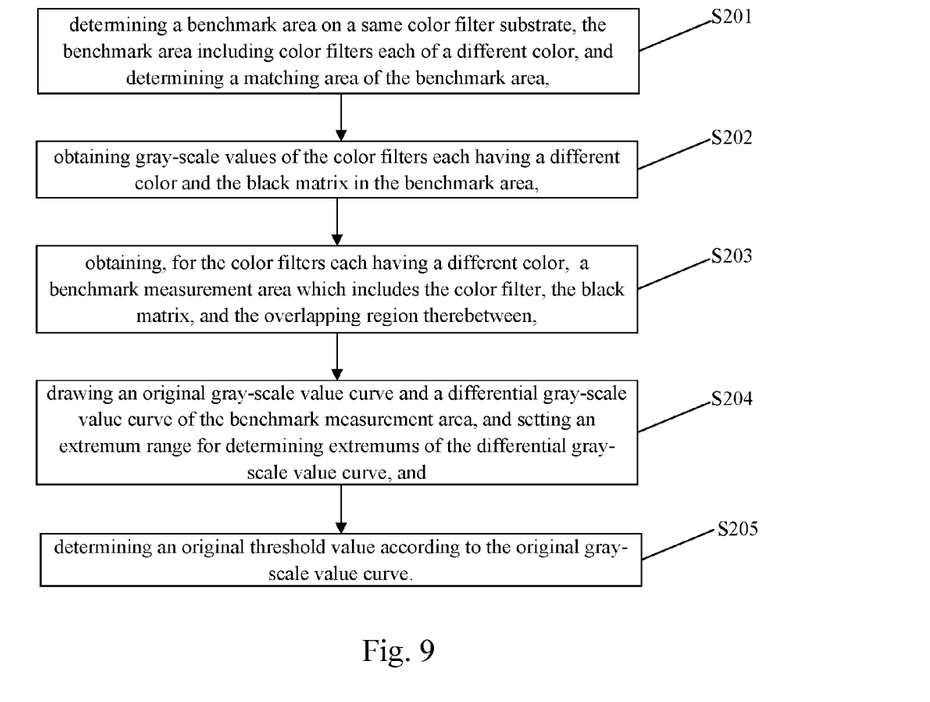
FIG. 9 schematically shows a flow chart 2 of the method for determining the edges of an overlapping region between a color filter and a black matrix according to the embodiments of the present disclosure.

In the present embodiment, prior to implementing the method as shown in FIG. 8, a benchmark area should be determined first, and some reference values should also be determined based on the benchmark area. As shown in FIG. 9, specific steps are as follows.

In step S201, a benchmark area on a same color filter substrate is determined, the benchmark area including color filters each having a different color, and then a matching area of the benchmark area is determined.

Specifically, as shown in FIG. 1, the benchmark area is an area selected on the color filter substrate, having an appropriate light intensity, and with overlapping regions 2 which are around each of the color filters 1 having basically a same width. As shown in FIG. 1, the matching area 7 determined in the benchmark area comprises an area on an array substrate which corresponds to a thin film transistor. The determination of the matching area 7 is helpful in acquiring an area to be detected which is similar to the benchmark area, which will facilitate the analysis of the area to be detected based on the benchmark area.

In step S202, the gray-scale values of the color filters each having a different color and the black matrix in the benchmark area are acquired.

Specifically, as shown in FIG. 1, a gray-scale value reference area 8 is selected from a larger area in each of the color filters 1 and the black matrix 2, and an average gray-scale value of the gray-scale value reference area 8 defaults to a gray-scale value of a corresponding color filter 1 or a corresponding black matrix 2. To ensure the accuracy of the gray-scale value to be obtained, the gray-scale value reference area 8 is usually located near the center of the larger area in the color filter 1 or in the black matrix 3.

In step S203, for each of the color filters each having a different color, a benchmark measurement area is acquired, the benchmark measurement area including a color filter, a black matrix, and an overlapping region therebetween.

Specifically, the benchmark measurement area 9 acquired from FIG. 1 is as shown in FIG. 2.

In step S204, an original gray-scale value curve and a differential gray-scale value curve of the benchmark measurement area are drawn, and an extremum range is set for determining extremums of the differential gray-scale value curve.

As shown in FIG. 3, after the benchmark measurement area 9 as shown in FIG. 2 is acquired, an original gray-scale value curve and a differential gray-scale value curve can be drawn according to the distribution of the gray-scale value of the benchmark measurement area 9. For ease of illustration, the original gray-scale value curve can be divided into phase a, phase b, phase c, and phase d according to the four phases thereof, and $G_a$, $G_b$, $G_c$, and $G_d$ are used to indicate the gray-scale values of the four phases respectively.

In order to determine the extremums of the differential gray-scale value curve, an extremum range $T_d$ is needed. The determination of the extremum range should be based on the distribution the differential gray-scale value curve, ensuring that the extremum range $T_d$, on the one hand, covers those less distinct extremums, and on the other, excludes those distinct extremums. As shown in FIG. 3, the differential gray-scale value curve moves mostly around a line indicating a gray-scale value of zero, and thus only several extremums (three in FIG. 3) are obviously larger or smaller than zero. Therefore, the extremum range $T_d$ can be set to be a range between two values located symmetrically around the line indicating the gray-scale value of zero, such as ±10, ±30, etc.

In step S205, an original threshold value is determined according to the original gray-scale value curve.

As shown in FIG. 3 by the dotted line, the original threshold value $T_S$ should enable the four phases of the original gray-scale value curve to be distributed evenly at two sides of the original threshold value $T_S$. That is, phase a and phase d having larger gray-scale values are located above the original threshold value $T_S$, and phase b and phase c having smaller gray-scale values are located below the original threshold value $T_S$. This means that the original threshold value $T_S$ should be: MAX $(G_b, G_c) \leq T_S \leq$ MIN $(G_a, G_d)$.

Further, based on the acquired benchmark area, a table of benchmark gray-scale values should be established for use in analyzing the area to be detected. Specific steps for establishing the table of benchmark gray-scale values are: adjusting light intensity, and obtaining gray-scale values of the color filter 1, the black matrix 3, and the overlapping region 2 therebetween in the benchmark measurement area under each light intensity; and generating and storing a table of benchmark gray-scale values. Specifically, regarding the benchmark measurement area 9 as shown in FIG. 2, the light intensity is increased gradually from zero, and for each increment of light intensity, four average gray-scale values of the four areas, namely a black matrix 3, a first overlapping region 21, a first overlapping region 22, as well as a color filter 1 in the benchmark measurement area 9, which are respectively expressed by $G_{a1}$, $G_{b1}$, $G_{c1}$, and $G_{d1}$, are recorded, until the gray-scale value of one of the four areas reaches saturation (for CCD with a 8 bit gray-scale value, the saturation gray-scale value is 255). For example, with regard to a color filter substrate, it is irradiated by a 100 W light source, and the light intensity is increased by 1 W each time. When the color filter substrate is irradiated with a light intensity of 86 W, the average gray-scale value of a color filter 1 in a benchmark measurement area 9 reaches 255. Then, a table of benchmark gray-scale values as follows can be obtained.

| | Light Intensity | | | | | | | | | | | | |
|---|---|---|---|---|---|---|---|---|---|---|---|---|---|
| | 0 | 1 | 2 | 3 | 4 | 5 | ... | 80 | 81 | 82 | 83 | 84 | 85 | 86 |
| $G_{a1}$ | 142 | 142 | 142 | 142 | 142 | 142 | ... | 142 | 142 | 142 | 142 | 142 | 142 | 142 |
| $G_{b1}$ | 36 | 36 | 36 | 36 | 35 | 36 | ... | 36 | 36 | 35 | 36 | 36 | 35 | 36 |
| $G_{c1}$ | 78 | 78 | 77 | 78 | 78 | 79 | ... | 78 | 78 | 78 | 78 | 78 | 77 | 78 |
| $G_{d1}$ | 83 | 85 | 87 | 89 | 91 | 93 | ... | 243 | 245 | 247 | 249 | 251 | 253 | 255 |

Obviously, the gray-scale value of the color filter 1 increases distinctly as the light intensity is increased.

After analyzing the acquired benchmark area, other areas of the color filter substrate can be detected according to the reference values determined by the benchmark area.

Figure 10:
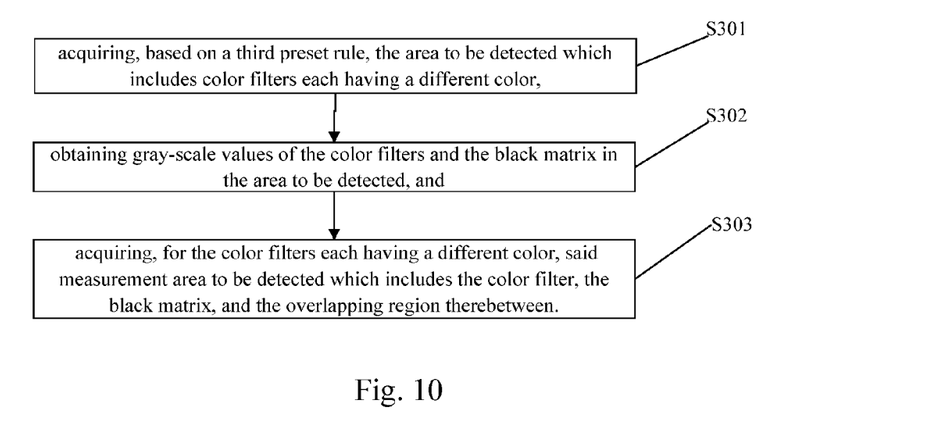
FIG. 10 schematically shows a flow chart 3 of the method for determining the edges of an overlapping region between a color filter and a black matrix according to the embodiments of the present disclosure.

In the method for determining the edges of the overlapping region 2 between the color filter 1 and the black matrix 3 as shown in FIG. 8, the first step thereof is to acquire a measurement area to be detected 9, which is shown in FIG. 10 and comprises the following steps.

In step S301, based on a third preset rule, an area to be detected, which includes color filters each having a different color, is acquired.

Specifically, based on the third preset rule, an area to be detected is acquired according to the matching area 7 and the position thereof in the benchmark area. The acquired area to be detected has a matching area 7 which matches the matching area 7 in the benchmark area with a matching degree being larger than a preset value (e.g., 95%), and the position of the matching area 7 in the area to be detected is the same as that of the matching area 7 in the benchmark area. Based on the reference values determined by the benchmark area, the area to be detected can be analyzed effectively, and the edges of the overlapping region 2 between the color filter 1 and a black matrix 3 can be determined. Obviously, as shown in FIG. 11, the acquired area to be detected has structures and shapes similar to the benchmark area, and comprises color filters 1 each having a different color.

In the present embodiment, it is supposed that the light intensity is lower when the area to be detected is acquired than when the benchmark area is acquired. Therefore, by comparing FIG. 11 with FIG. 1, it can be judged from the density of the filled pattern that the gray-scale value of the color filter 1 in the area to be detected is smaller than that of the color filter 1 in the benchmark area.

In step S302, the gray-scale values of the color filters and the black matrix in the area to be detected are obtained.

Figure 11:
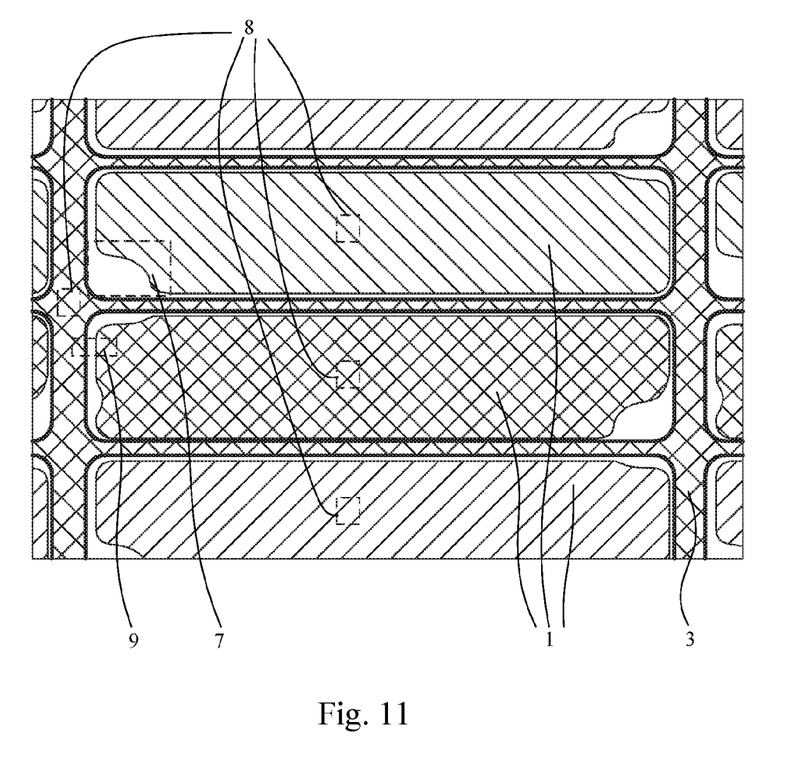
FIG. 11 schematically shows an area to be detected according to the embodiments of the present disclosure.

Similar to what is done to the benchmark area, as shown in FIG. 11, a gray-scale value reference area 8 is selected from a larger area in each of the color filters 1 and the black matrix 3. An average gray-scale value of the gray-scale value reference area 8 is used to indicate a gray-scale value of the color filter 1 or the black matrix 2.

In step S303, for each of the color filters each having a different color, said measurement area to be detected, which includes a color filter, a black matrix, and an overlapping region therebetween, is acquired.

Similar to the benchmark area as shown in FIG. 1, a measurement area to be detected 9 of a color filter is acquired from the area to be detected as shown in FIG. 11.

Figure 12:
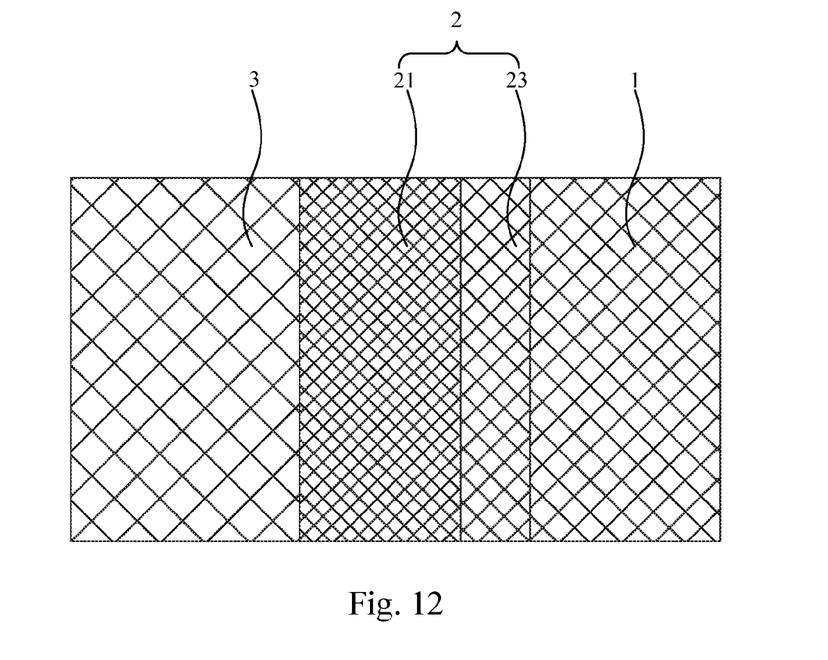
FIG. 12 shows a larger version of a measurement area according to FIG. 11.

As shown in FIG. 12, obviously, the gray-scale value of the color filter 1 in the benchmark measurement area 9 is larger than that of the color filter 1 in the measurement area to be detected 9, and the gray-scale value of each of other areas remains almost the same.

Then, the method for determining the edges of an overlapping region between a color filter and a black matrix as shown in FIG. 8 is carried out.

As shown in FIG. 8, after the measurement area to be detected 9 is acquired, similar to what is done to the benchmark measurement area 9, an original gray-scale value curve and a differential gray-scale value curve of the measurement area to be detected are drawn. In the meanwhile, extremums of the differential gray-scale value curve are determined based on the preset extremum range.

At this moment, the differential gray-scale value curve of the measurement area to be detected has three extremums.

Further, as shown in FIG. 8, according to the gray-scale values of the color filter 1 and the black matrix 3 in the measurement area to be detected 9, and at the same time based on the a preset rule, a gray-scale value of the overlapping region 2 between the color filter 1 and the black matrix 3 is obtained. According to the first preset rule, gray-scale values of a corresponding color filter 1 and a corresponding black matrix 3 are found out from the table of benchmark gray-scale values based on the gray-scales value of the color filter 1 and the black matrix 3 in the measurement area to be detected 9, and then a gray-scale value of the overlapping region 2 is obtained from the table of benchmark gray-scale values. Specifically, the gray-scale values of the color filter 1 and the black matrix 3 that are equal to or closest to each other are found out from the table of benchmark gray-scale values.

For example, supposing the gray-scale values of the color filter 1 and the black matrix are respectively 91 and 142, by looking up the table of benchmark gray-scale values, it can be obtained that the gray-scale values of the first overlapping region 21 and the second overlapping region 22 of the overlapping region 2 are respectively 36 and 78.

Then, after obtaining the gray-scale values of the color filter 1, the black matrix 3, and the overlapping region 2, a threshold value $T'_S$ can be established based on a second preset rule. According to the second preset rule, the threshold value $T'_S$ is established based on the original threshold value $T_S$, the gray-scale values of the color filter 1 and the black matrix 3 in the measurement area to be detected 9, and the gray-scale values of the corresponding color filter 1, black matrix 3, and overlapping region 2 in the table of benchmark gray-scale values.

As shown in FIG. 2, at this moment, the obtained overlapping region 2 in the benchmark measurement area 9 comprises a first overlapping region 21 and a second overlapping region 22 having different gray-scale values. As shown in FIG. 12, the acquired measurement area to be detected 9 also comprises a first overlapping region 21 and a second overlapping region 22 having different gray-scale values. Therefore, according to the second preset rule, specifically, the threshold value T'$_S$ is established based on a smaller one of the gray-scale values of the color filter 1 and the black matrix 3 in the measurement area to be detected 9, a larger one of the gray-scale values of the corresponding color filter 1 and the corresponding black matrix 3 in the table of benchmark gray-scale values, and a larger one of the obtained gray-scale values of the first overlapping region 21 and the second overlapping region 22 of the overlapping region 22, and also based on the original threshold value T$_S$. That is, the threshold value T'$_S$ is established based on the following formula:

$$T'_S = \left(\frac{t_2 - t_1}{t_3 - t_1}\right) * T_S + t_1 * \left(\frac{t_2 - t_3}{t_3 - t_1}\right).$$

In the above formula, $t_1$=MAX ($G_b$, $G_c$), $t_2$=MIN ($G'_a$, $G'_d$), $t_3$=MAX ($G_a$, $G_d$), wherein $G'_a$ and $G'_b$ refer to the gray-scale values of the color filter 1 and the black matrix 3 in the measurement area to be detected 9 respectively.

Figure 13:
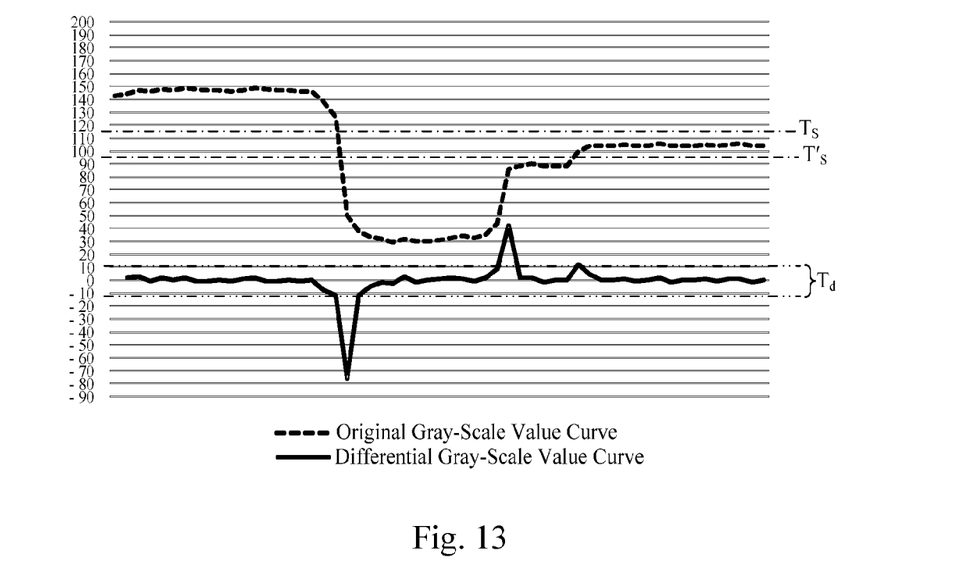
FIG. 13 schematically shows an original gray-scale value curve and a differential gray-scale value curve according to FIG. 12.

As shown in FIG. 13, in the present embodiment, since the gray-scale value of the color filter 1 in the measurement area to be detected 9 is smaller than that of the color filter 1 in the benchmark measurement area 9, the threshold value T'$_S$ (as shown by the dot double-line) is smaller than the original threshold value T$_S$ (as shown by the dot line).

Then, two intersections of the threshold value T'$_S$ and the original threshold value T$_S$ are obtained. And then, two extremums on the differential gray-scale value curve which are the closest to said two intersections can be obtained, and the edges of the overlapping region 2 between the color filter 1 and the black matrix 3 can be determined based on the two extremums.

For example, as shown in FIGS. 12 and 13, the two extremums on the differential gray-scale value curve being closest to the two intersections are the leftmost extremum and the rightmost extremum respectively. Besides, based on the measurement area to be detected 9 and the differential gray-scale value curve, it can be judged that each extremum of the differential gray-scale value curve exactly corresponds to an edge of an area of the measurement area to be detected 9. Thus, the edges of the overlapping region 2 between the color filter 1 and the black matrix 3 can be obtained based on the two extremums.

The method for determining the edges of the overlapping region 2 also apply to the situations where the light intensity is inappropriate or the width of the overlapping region varies, and consequently the number of the extremums obtained based on the extremum range T$_d$ is not three. As shown in FIG. 4, when the light intensity is low or the width of the overlapping region 2 is large, the measurement area to be detected 9 might comprises five areas according to the gray-scale values, and the overlapping region 2 comprises a first overlapping region 21, a second overlapping region 22, and a third overlapping region 23 having different gray-scale values. Accordingly, as shown in FIG. 5, the original gray-scale value curve corresponding to the measurement area to be detected 9 comprises five phases, and has four distinct extremums based on the obtained differential gray-scale value curve and the extremum range T$_d$. As shown in FIG. 5, intersections of the threshold value T'$_S$ and the original gray-scale value curve are obtained based on the established threshold value T'$_S$, and the two extremums closest to said two intersections are the leftmost extremum and the rightmost extremum respectively. Thus, the edges of the overlapping region 2 between the color filter 1 and the black matrix 3 can be obtained based on the two extremums.

Figure 6:
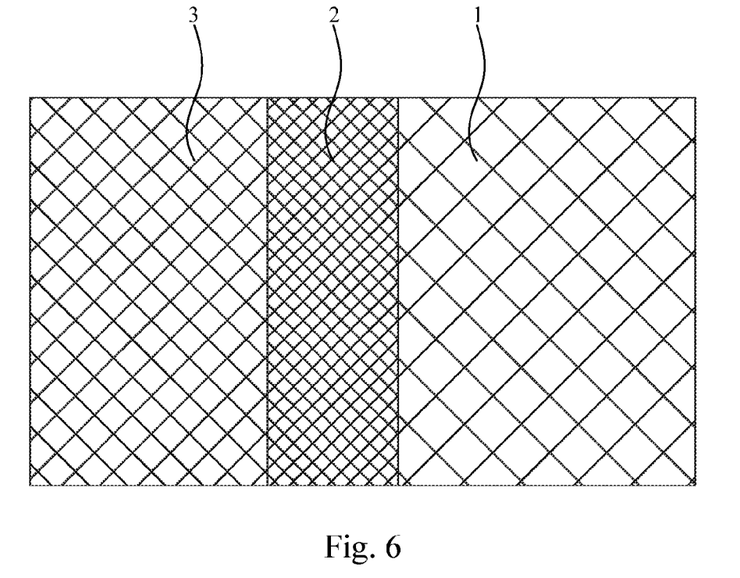
FIG. 6 schematically shows a larger version 3 of the measurement area according to FIG. 1.
Figure 7:
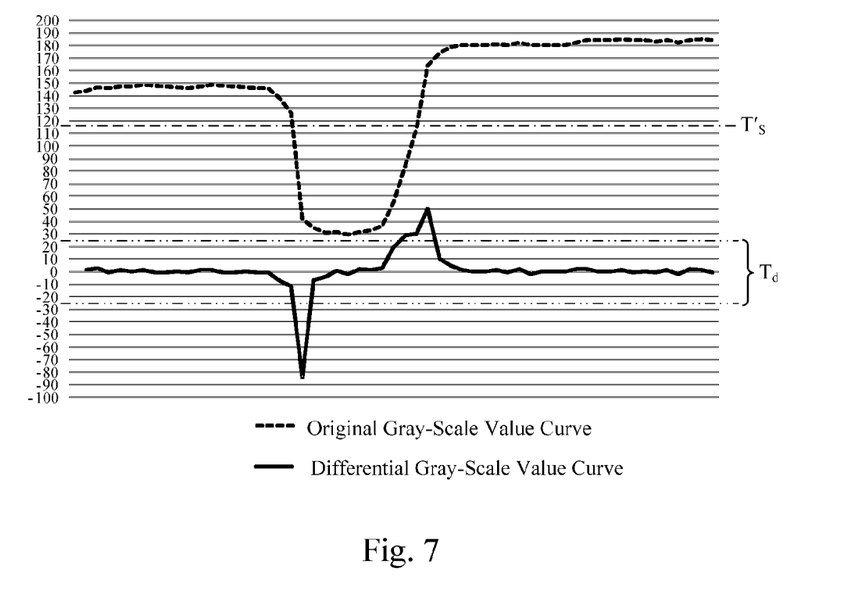
FIG. 7 shows an original gray-scale value curve and a differential gray-scale value curve according to FIG. 6.

In addition, as shown in FIG. 6, when the width of the overlapping region 2 is small, the measurement to be detected 9 might comprise only three areas based on the gray-scale values, and there is no obvious difference in the overlapping region 2. Accordingly, the original gray-scale value curve corresponding to the measurement area to be detected 9 comprises three phases, and has merely two distinct extremums based on the obtained differential gray-scale value curve and the extremum range. As shown in FIG. 7, intersections of the threshold value T'$_S$ and the original gray-scale value curve are obtained based on the established threshold value T'$_S$, and the two extremums closest to the two intersections are the leftmost extremum and the rightmost extremum respectively. Thus, the edges of the overlapping region 2 between the color filter 1 and the black matrix 3 can be obtained based on the two extremums.

From the above, it is concluded that on the left side of the leftmost extremum is the black matrix 3, and on the right side thereof is the overlapping region 2, and therefore, the leftmost extremum corresponds to the edges of the black matrix 3. Likewise, on the right side of the rightmost extremum is the color filter 1, and on the left side thereof is the overlapping region 2, and therefore, the rightmost extremum corresponds to the edges of the color filter 1. Obviously, the method for determining the edges of the overlapping region provided in the present disclosure is to determine the edges of the black matrix 3 and the color filter 1 first, and then obtain the edges of the overlapping region 2.

Further, after determining the edges of the overlapping region, an original gray-scale value curve can be fitted by Gauss curve fitting method or binomial differential method, and based on the determined edges of the overlapping region 2 between the color filter 1 and the black matrix 3, the position of the edges under sub-pixel precision is obtained, thereby obtaining a width value of the overlapping region 2.

It should be noted that, in the present embodiment, for ease of illustration, FIG. 1 or FIG. 11 comprises only one measurement area 9. But in fact, the widths of the overlapping region 2 around the color filter 1 are not necessarily the same. In practice, to better know the widths of the overlapping regions 2 each around the color filter 1, it is necessary to acquire at least one measurement area 9 from each edge of the color filter 1, which will not be described in detail in the present embodiment.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

LIST OF REFERENCE SIGNS

1—color filter;
2—overlapping region;
21—first overlapping region;
22—second overlapping region;
23—third overlapping region;
3—black matrix;
7—matching area;
8—gray-scale value reference area;
9—measurement area.

The invention claimed is:

1. A method for determining edges of an overlapping region between a color filter and a black matrix, comprising:
   acquiring a measurement area to be detected which includes a color filter, a black matrix, and an overlapping region therebetween,
   drawing an original gray-scale value curve and a differential gray-scale value curve of the measurement area to be detected, and determining extremums of the differential gray-scale value curve according to a predetermined extremum range,
   obtaining a gray-scale value of the overlapping region between the color filter and the black matrix according to gray-scale values of the color filter and the black matrix in the measurement area to be detected, based on a first preset rule,
   establishing a threshold value according to the gray-scale values of the color filter, the black matrix, and the overlapping region, based on a second preset rule, and
   obtaining, according to two intersections of the threshold value and the original gray-scale value curve, two extremums of the differential gray-scale value curve which are the closest to said two intersections respectively, and determining the edges of the overlapping region between the color filter and the black matrix based on said two extremums.

2. The method according to claim 1, wherein the step of acquiring the measurement area to be detected which includes the color filter, the black matrix, and the overlapping region therebetween further comprises:
   acquiring, based on a third preset rule, an area to be detected which includes color filters each having a different color,
   obtaining gray-scale values of the color filters and the black matrix in the area to be detected, and
   acquiring, for each of the color filters each having a different color, said measurement area to be detected which includes the color filter, the black matrix, and the overlapping region therebetween.

3. The method according to claim 2, further comprising:
   determining a benchmark area on a same color filter substrate, the benchmark area including color filters each having a different color, and determining a matching area of the benchmark area,
   obtaining gray-scale values of the color filters each having a different color and the black matrix in the benchmark area,
   acquiring, for each of the color filters each having a different color, a benchmark measurement area which includes the color filter, the black matrix, and the overlapping region therebetween,
   drawing an original gray-scale value curve and a differential gray-scale value curve of the benchmark measurement area, and setting an extremum range for determining extremums of the differential gray-scale value curve, and
   determining an original threshold value according to the original gray-scale value curve.

4. The method according to claim 3, further comprising:
   adjusting light intensity, and obtaining, under each light intensity, gray-scale values of the color filter, the black matrix, and the overlapping region therebetween in the benchmark measurement area, and
   generating a table of benchmark gray-scale values.

5. The method according to claim 4, wherein in the first preset rule:
   finding out, according to the gray-scale values of the color filter and the black matrix in the measurement area to be detected, gray-scale values of a corresponding color filter and a corresponding black matrix from the table of benchmark gray-scale values, and obtaining a gray-scale value of a corresponding overlapping region from the table of benchmark gray-scale values.

6. The method according to claim 5, wherein in the second preset rule:
   establishing a threshold value according to the original threshold value, the gray-scale values of the color filter and the black matrix in the measurement area to be detected, and the gray-scale values of the corresponding color filter, black matrix and overlapping region in the table of benchmark gray-scale values.

7. The method according to claim 6, wherein the overlapping region includes a first overlapping region and a second overlapping region having different gray-scale values.

8. The method according to claim 7, wherein in the second preset rule, specifically:
   establishing a threshold value according to a smaller one of the gray-scale values of the color filter and the black matrix in the measurement area to be detected, a larger one of the gray-scale values of the corresponding color filter and black matrix in the table of benchmark gray-scale values, and a larger one of obtained gray-scale values of the first overlapping region and the second overlapping region in the overlapping region, based on the original threshold value.

9. The method according to claim 3, wherein in the third preset rule:
   acquiring an area to be detected according to the matching area and a position thereof in the benchmark area.

10. The method according to claim 1, further comprising, after determining the edges of the overlapping region between the color filter and the black matrix according to the two extremums, a step:
    fitting an original gray-scale value curve by Gauss curve fitting method or binomial differential method, and obtaining a width value of the overlapping region based on the determined edges of the overlapping region between the color filter and the black matrix.

* * * * *